United States Patent [19]

De Feo

[11] 4,311,166
[45] Jan. 19, 1982

[54] VALVE ASSEMBLY FOR USE WITH HIGH TEMPERATURE AND HIGH PRESSURE FLUIDS

[75] Inventor: Angelo De Feo, Totowa, N.Y.

[73] Assignee: Curtiss-Wright Corporation, Wood-Ridge, N.J.

[21] Appl. No.: 161,284

[22] Filed: Jun. 20, 1980

[51] Int. Cl.³ .................. F16K 3/30; F16K 1/22
[52] U.S. Cl. .................. 137/375; 251/124; 251/305; 251/368
[58] Field of Search .............. 29/157.1 R; 137/375, 137/468, 340; 251/356, 368, 305, 124

[56] References Cited

U.S. PATENT DOCUMENTS

| | | | |
|---|---|---|---|
| 2,352,799 | 7/1944 | Newton | 137/375 |
| 3,537,682 | 11/1970 | Priese | 137/375 |
| 3,701,359 | 10/1972 | Worley et al. | 137/375 |
| 3,964,507 | 6/1976 | Jondrasi et al. | 137/375 |
| 4,261,385 | 4/1981 | Worley | 137/340 |

FOREIGN PATENT DOCUMENTS 2615041  10/1971  Fed. Rep. of Germany ...... 137/375

*Primary Examiner*—A. Michael Chambers
*Attorney, Agent, or Firm*—Arthur L. Frederick

[57] ABSTRACT

The valve assembly for use with high temperature and high pressure fluids has inner and outer spaced shells and a valve actuator support of inner and outer spaced members which are connected at their end portions to the inner and outer shells, respectively, to extend substantially normal to the longitudinal axis of the inner shell. A layer of resilient heat insulating material covers the outer surfaces of the inner shell and the inner actuator support member and is of a thickness to only occupy part of the spaces between the inner and outer shells and inner and outer actuator support members. The remaining portion of the space between the inner and outer shells and the space between the inner and outer members is substantially filled with a body of castable, rigid refractory material. A movable valve member is disposed in the inner shell. A valve actuator assembly is supported in the valve actuator support to extend into the inner shell for connection with the movable valve member for movement of the movable valve member to positions from a fully open to a fully closed position to control flow of fluid through the inner shell. An anchor mneans is disposed adjacent opposite sides of the axis of the valve actuator support and attached to the inner shell so that relative radial movement between the inner and outer shell is permitted by the layer of resilient heat insulating material and relative longitudinal movement of the inner shell to the outer shell is permitted in opposite directions from the anchor means to thereby maintain the functional integrity of the movable valve member by providing an area of the inner shell surrounding the movable valve member longitdinally stationary, but at the same time allowing radial movement.

19 Claims, 4 Drawing Figures

VALVE ASSEMBLY FOR USE WITH HIGH TEMPERATURE AND HIGH PRESSURE FLUIDS

The U.S. Government has rights in this invention pursuant to Contract No. EX 76-C-01-1726 awarded by the U.S. Energy Research and Development Administration now known as the Department of Energy.

This invention relates to valve assemblies and more particularly to valve assemblies suitable for use with high temperature and high pressure fluids.

BACKGROUND OF THE INVENTION

Valve assemblies which are required in conduit systems through which high temperature and high pressure fluids flow, e.g. 1600° F. and 105 psi, must not only have the requisite strength to withstand the high internal pressure but must be heat insulated so that the outer surfaces are relatively cool, e.g. 250° F., for safety reasons. Additionally, the valve structure must be such as to maintain functional integrity in spite of differential thermal expansion and contraction of the valve assembly components.

Accordingly, it is an object of the present invention to provide a valve assembly which is capable of withstanding high temperature and high pressure fluids therein. Another object of this invention is to provide a valve assembly in which functional integrity of the valve assembly is maintained during differential thermal expansion and contraction of the valve assembly components. A further object of the present invention is to provide a valve assembly which has an outer surface temperature substantially less than the temperature of the fluid within the valve assembly.

SUMMARY OF THE INVENTION

Therefore, the present invention contemplates a novel valve assembly capable of use in systems having high temperature and high pressure fluids. The valve assembly comprises spaced coaxial inner and outer shells to which is connected between their opposite ends a valve actuator support. The valve actuator support extends substantially normal to the longitudinal axis of the inner shell. A layer of resilient insulating material covers substantially the entire outer surface of the inner shell and is of a thickness so as to only occupy part of the space between the inner and outer shells. A body of castable, rigid refractory material is disposed within the remaining space between the inner and outer shells. A valve actuator element is supported in the valve actuator support to project into the inner shell. A movable valve member is disposed in said inner shell and is connected to the valve actuator element for movement to positions from a fully open to a fully closed position to thereby control fluid flow through said inner shell. An anchor means is connected to the inner shell adjacent the movable valve member for securing the inner shell in the area of the movable valve member against longitudinal movement while not preventing radial movement relative to the outer shell and the layer refractory material. The inner and outer shells, at their opposite end portions, are provided with connecting means for securing the valve assembly to fluid conducting elements.

In a more narrow aspect of the invention, the valve assembly has an inner shell which has a generally venturi configuration with a centrally located constricted throat portion in which is disposed the movable valve member. The anchor means includes two sets of pins adjacent opposite sides of the movable valve member with each set comprising a plurality of circumferentially spaced pins lying in a plane substantially normal to the longitudinal axis of the inner shell. Each of these pins is secured at one end to the throat portion of the inner shell to extend radially from the latter and into a hole in the refractory body, which hole is oversized in length. The two sets of pins secure the throat portion against longitudinal movement relative to the outer shell, but allows relative radial movement between the inner and outer shells so that the functional integrity of the movable valve member is maintained.

Another feature of this invention is that the valve actuator support comprises two tubular members telescopically arranged to slide relative to each other upon relative radial movement of the inner and outer shells.

BRIEF DESCRIPTION OF THE DRAWINGS

The invention will be more fully understood from the following detailed description thereof when considered in connection with the accompanying drawing wherein one embodiment of the invention is illustrated by way of example and in which.

DESCRIPTION OF THE PREFERRED EMBODIMENT

Figure 1:
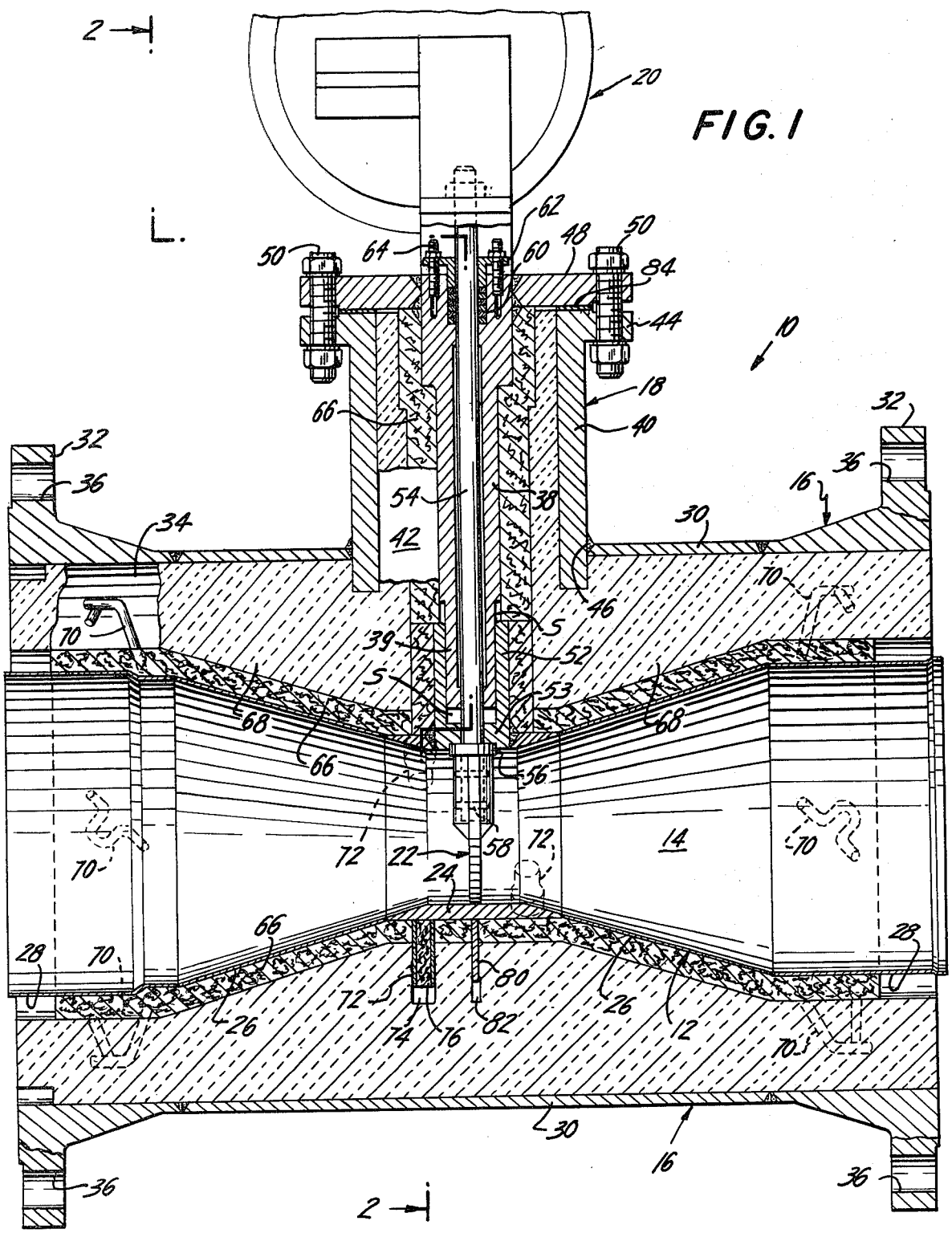
FIG. 1 is a longitudinal cross-sectional view of the valve assembly according to this invention.
Figure 2:
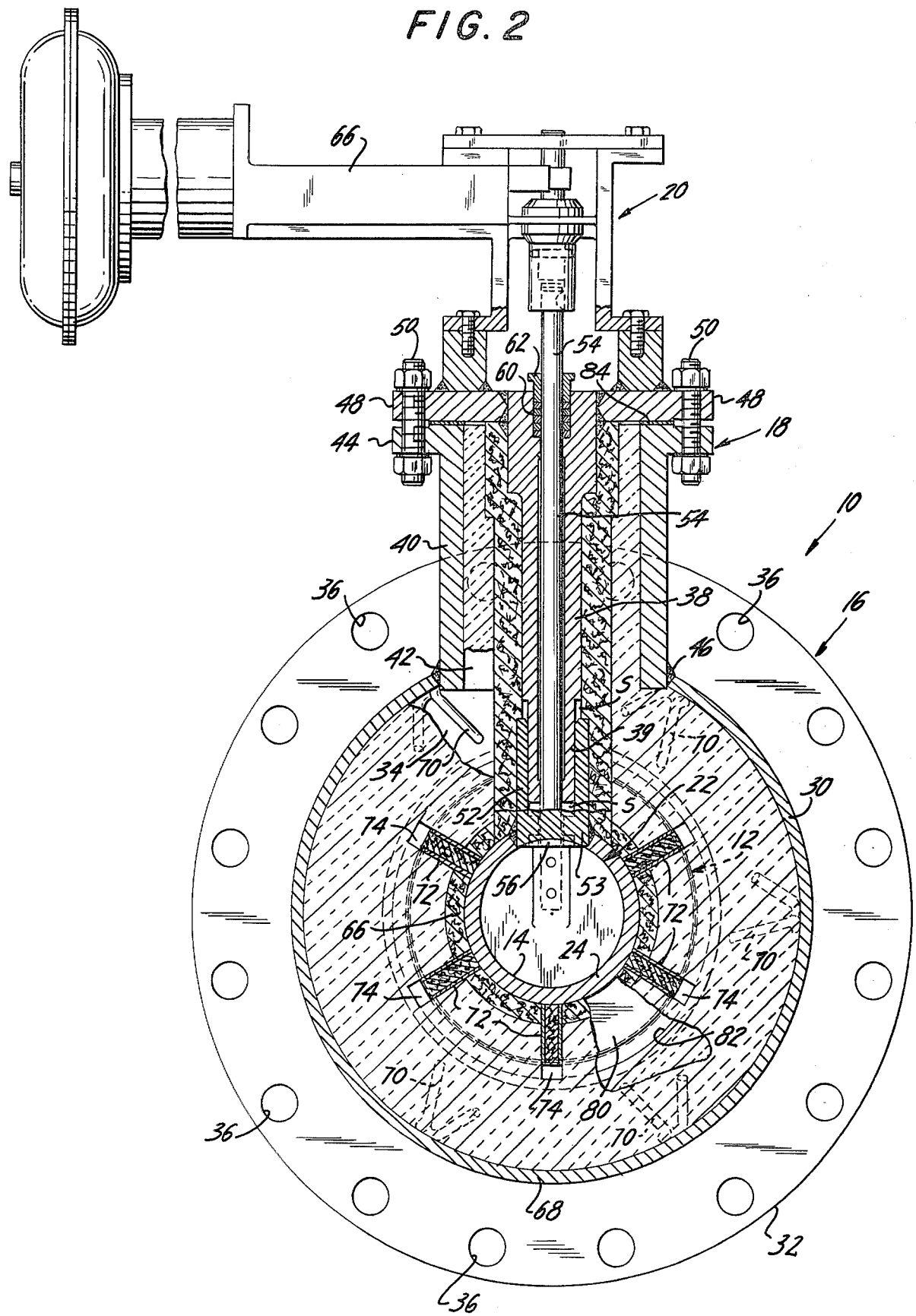
FIG. 2 is a cross-sectional view taken substantially along line 2—2 of FIG. 1.

Now, referring to the drawings, and more particularly, to FIGS. 1 and 2, the reference number 10 generally refers to the valve asembly according to this invention. The valve assembly 10 comprises essentially an inner shell 12 which defines therein a fluid passageway 14, an outer shell 16 coaxial with and spaced from inner shell 12, a valve actuator support 18 extending substantially normal to the longitudinal axis of inner shell 12, a valve actuator assembly 20 supported by valve actuator support 18 and a movable valve member 22 disposed in inner shell 12 and connected to the valve actuator assembly for movement to control flow of fluid through passageway 14.

The inner shell 12 has a venturi configuration with a centrally located constricted throat portion 24, flared intermediate portions 26 extending from opposite sides of the throat portion 24 and generally cylindrical, tubular end portions 28 connected to the flared portions 26. The flared portions 26 and end portions 28 are of relatively thin walled metal while throat portion 24 is constructed of substantially thicker walled metal.

The outer shell 16 has a cylindrical central portion 30 and opposite flanged end portions 32. The outer shell is disposed substantially concentrically with inner shell 12 and has an internal diameter greater than the outside diameter of the end portions 28 of inner shell 12 so that an annular space 34 is defined therebetween. The flanged end portions 32 have a plurality of circumferentially spaced holes 36 for receiving bolts (not shown) which pass through registered holes (not shown) in adjacent fluid conducting elements or conduits (not shown). The metal wall of outer shell 30 is relatively thick to provide the strength to withstand the force of the internal pressure of the fluid which force is transmitted to the outer shell as hereinafter explained.

The valve actuator support 18 comprises an inner hollow cylindrical member or bushing 38 and an outer hollow cylindrical member 40 of larger diameter than inner member 38 and disposed coaxially to bushing 38 to form an annular space 42 therebetween. The outer member 40 has a flanged end portion 44 and is secured, as by welding, at its opposite end portion within an opening 46 in central portion 30 of outer shell 16, while the bushing 38 is secured at one end portion, as by welding, to a mounting disc 48 by which bushing 38 is secured, via stud bolts 50, to flanged end portion 44 of outer member 40. The longitudinal, coincident axes of bushing 38 and outer member 40 are substantially normal to the longitudinal axis of inner shell 12. The lower, reduced diameter portion 39 of bushing 38 is receivable in a cup-shaped guide sleeve 52 which also forms part of the valve actuator support 18. The guide sleeve 52 has a closed end 53 and is coaxially arranged with respect to bushing 38 and is secured, as by welding, in an opening in the wall of throat portion 24 of inner shell 12. The closed end 53 of guide sleeve 52, adjacent throat portion 24, has an opening which communicates with passageway 14 and through which extends a shaft 54 of valve actuator assembly 20. The guide sleeve 52 also has, in the closed end thereof, a recess for receiving a thrust washer 56 against which bears movable valve member 22. The movable valve member, as shown may be of disc shape. The overall length of bushing 38 is such that its inner end is spaced from closed end 53 of guide sleeve 52 and the reduced diameter portion 39 is of such length that the annular shoulder formed thereby is spaced from the upper end of guide sleeve 52. The two spaces S permit radial relative movement between the guide sleeve 52 and bushing 38 upon radial movement between inner and outer shells 12 and 16. The bushing 38 has a longitudinal bore into which is receivable actuator shaft 54 for supporting the latter for rotation about its longitudinal axis.

The actuator shaft 54, which forms part of the valve actuator assembly 20 extends through bushing 38, the end wall of guide sleeve 52 and thrust washer 56 and into a recess formed by an enlarged portion of movable valve member 22. The movable valve member 22 is secured in any suitable manner to the adjacent end of actuator shaft 50, as for example by tapered pins 58, so that rotation of shaft 54 effects rotation of the movable valve member 22 to positions from the fully closed position shown to a fully open position (not shown). To seal the interstices between shaft 54 and the bore surfaces of bushing 38, there is provided a packing assembly comprising packing rings 60, which are disposed in a countered bored portion of bushing 38, and a packing retainer or gland 62 secured by stud bolts 65 to the outer end of the bushing. The valve actuator assembly 20 also includes any suitable rotary power mechanism 66 of electrical, pneumatic or hydraulic type and suppoting frame connected to effect rotative movement of actuator shaft 54 and hence movement of valve member 22.

The valve assembly 10 of this invention includes insulation sufficient to maintain the temperature of outer shell 16 substantially less than the temperature of the fluid in passageway 14. As for example, if the fluid in passageway 14 is about 1600° F., the insulation maintains the outer surface of outer shell 16 at about 250° F. The insulation according to this invention comprises a layer 66 of resilient insulating material, as for example, a long fibered ceramic woven or non-woven, blanket such as Insblanket distributed by A. P. Green Company of Mexico, Mo., and a body 68 of castable refractory material.

The layer 66 of resilient insulation is applied to cover substantially the entire outer surface of inner shell 12 and the outer surfaces of bushing 38 and guide sleeve 52 of valve actuator support 18. The layer 66 may be applied by wrapping the insulating material about inner shell 12 and guide sleeve 52 after the latter is secured to the inner shell 12, but before assembly with outer shell 16. The insulating material is compressed to about one-half of its original thickness and is wrapped with commercially available polyethylene tape (not shown) which is held together by masking tape (not shown). Similarly, bushing 38 has its outer surface covered with insulating layer 66 to a point slightly below the annular shoulder formed by reduced diameter end portion 39. This insulating layer may be applied by the same technique prior to its being secured to outer member 40. After bolting bushing 38, through its mounting flange 48 to outer member 40 and securing movable valve member 22 in throat portion 24 to shaft 54, the inner shell is held in concentric relationship to outer shell 16 and flange 48 of bushing 38 and outer member 40 are doweled in position. Thereafter, refractory material is poured into spaces 34 and 42 remaining between the layer 66 of resilient insulating material and the inner surfaces of outer shell 16 and outer member 40. When the poured refractory material hardens into body 68, such body, in combination with the relatively thick walls of outer shell 16, provides valve assembly 10 with the requisite strength to withstand the relatively high fluid pressure as well as the requisite heat insulating requirement.

Figure 4:
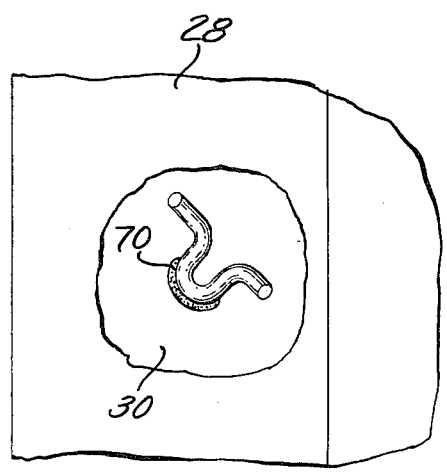
FIG. 4 is an enlarged detailed view of the anchor clips according to this invention.

The body 68 of refractory material, when cured and hardened, is anchored to outer shell 16 by two sets of circumferentially spaced anchors 70. As best shown in FIG. 4 each anchor is a rod formed into a generally U-shape and welded at the U-bend portion thereof to the inner surface of the flanged end portions 32 of outer shell 16. The refractory body 68 is of refractory material which, when cured and hardened, has high compressive strength.

The functional integrity of valve assembly 10 is maintained according to this invention in spite of differential movement of the inner and outer shells 12 and 16 by an anchor means which secures the throat portion 24 against movement. Preferably, as shown, the anchor means comprises two sets of pins 72. Each set of pins 72 comprises a plurality of circumferentially spaced pins with each pin 72 secured at one end to throat portion 24 to extend radially therefrom. The pin 72 of each set lie in substantially the same plane which is substantially normal to the longitudinal axis of inner shell 12 and substantially parallel to the plane of the other set of pins. Each set of pins is disposed on opposite sides of the longitudinal axis of shaft 54 and closely adjacent movable valve member 22. Preferably, there are five pins in each set and each pin 72 of each set is, as best shown in FIG. 2, angularly offset from the pin of the other set about 60°. Each pin 72 extends into blind-hole 74 formed in the refractory material and oversized in length relative to pin 72 so that the throat portion 24 is fixed against longitudinal movement relative to refractory body 68 and outer shell 16, but is free to radial move relative to refractory body 68 and outer shell 16.

Each pin 72 is preferably hollow and packed with insulating material 76 such as the material comprising layer 66 to avoid hot spots on the outer shell by reason of heat flow through the hollow pins.

Figure 3:
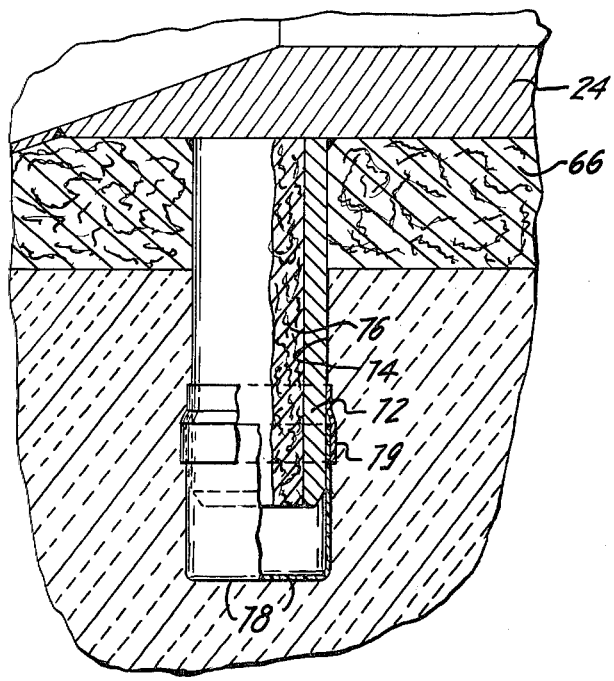
FIG. 3 is an enlarged fragmentary view of the valve assembly showing a pin prior to use of the valve assembly and vaporization of the cap.

As best illustrated in FIG. 3, each of the blind-holes 74 is formed by temporarily securing, as by taping at 79, a cap 78 of polyethylene to the distal end of the associated hollow pin 72 after it has been filled with insulating material. The refractory layer 66 is applied to the outer surface of inner shell 12 and around pins 72. The castable refractory material after being poured into space 34, hardens around each pin 72 and its cap 78. The polyethylene cap 78 under high temperatures vaporizes, thus leaving a blind-hole 72 longer in length than its associated pin 72 which thereby permits radial movement of the pins relative to the refractory body 68.

The valve assembly 10 also has a gas barrier in the form of an annular baffle 80 which is secured to the throat portion 24 and guide sleeve 52. The baffle 80 is disposed transversely to the longitudinal axis of valve assembly 10 and in the plane of movable valve member 22 when fully closed. Since the joints between the end portions 28 of inner shell 12 and the adjacent fluid conducting elements (not shown) are not fluid-tight, baffle 80 serves to block any fluid from bypassing the valve member 22, which fluid may have infiltrated the relatively porous layer 66 of insulating material by reason of the differential pressure across the valve member 22 when partly or fully closed. The baffle 80 extends into a radially oversized annular slot 82 in layer 66 and body 68 of insulating material so that baffle 80 can radially move relative to the slot and thus not hamper radial movement of throat portion 24 relative to outer shell 16 and/or fracture the refractory body 68. The radial slot is formed, similar to blind-holes 74, in the refractory body 68 by an annular polyethylene cap taped to the distal, peripheral end portion of baffle 80 before pouring of the refractory body 68 in the spaces 34 and 42. Also to avoid gas leakage through the insulation of valve actuator support 18, a flexible gasket 84 is interposed between mounting disc 48 and flanged end portion 44.

It is believed now readily apparent that the present invention provides a valve assembly which is capable of controlling flow of high temperature and high pressure fluids by maintaining functional integrity of the valve despite differential expansion and contraction of the valve components. It is a valve assembly which has the requisite insulation so that the external surface temperature is substantially less than that of the fluid in said valve assembly.

Although but one embodiment of the invention has been illustrated and described in detail, it is to be expressly understood that the invention is not limited thereto. Various changes can be made in the arrangement of parts without department from the spirit and scope of the invention as set forth in the appended claims and as the same will not be understood by those skilled in the art.

What is claimed is:

1. A valve assembly capable of use with fluids of high temperature and pressure comprising:
   a. inner and outer shells diametrically sized to form a first space therebetween;
   b. a valve actuator support having coaxially disposed inner and outer tubular members diametrically sized to define a second space therebetween communicating with said first space.
   c. said inner tubular member has two telescopically arranged portions, one portion being secured to the outer shell while the other portion is secured to the inner shell;
   d. a layer of resilient insulating material covering substantially all of the outer surfaces of said inner shell and of said inner tubular member of said valve actuator support and of a thickness to occupy part of the first and second spaces;
   e. a body of refractory material disposed within the first and second spaces in the space remaining between the inner and outer shells and between the inner and outer tubular members;
   f. a valve actuator means supported by said inner and outer tubular members and projecting into the inner shell;
   g. a movable valve member in said inner shell and connected to the valve actuator means for movement to positions from a fully open to a fully closed position to thereby control fluid flow through said inner shell;
   h. anchor means connected to said inner shell adjacent said movable valve member for securing said inner shell in the area of the movable valve against longitudinal movement relative to the outer shell and refractory body while not preventing radial movement of said inner shell relative to the outer shell and refractory body; and
   i. connecting means at opposite ends of the inner and outer shell for connecting said shells to fluid conducting elements.

2. The valve assembly of claim 1 wherein said movable valve member is a disc of a diameter to provide a running, sealing fit with the inner surface of said inner shell and supported for rotative movement.

3. The valve assembly of claim 1 wherein said anchor means includes a plurality of circumferentially spaced pins secured to the inner shell and extending radially from the latter into the body of the refractory material, the pins being arraned in a plane normal to the longitudinal axis of the inner shell.

4. The valve assembly of claim 3 wherein each of said pins extends into a blind-hole in the refractory material, said blind-hole being of a length greater than that of the pin so that the pin is axially slidable in said blind-hole.

5. The valve assembly of claim 1 wherein said anchor means includes two sets of circumferentially spaced pins with the pins of each set lying in a plane normal to the longitudinal axis of the inner shell, each pin being secured at one end of the inner shell and radially extending from the latter into a hole in the refractory material and oversized in length relative to the associated pin so that the associated pin is free to move along its axis with radial movement of the inner shell relative to the outer shell.

6. The valve assembly of claim 5 wherein each pin is tubular and filled with heat insulating material.

7. The valve assembly of claim 1 wherein said inner shell has a general venturi configuration with a centrally located constricted throat portion.

8. The valve assembly of claim 7 wherein said movable valve member is located in the contricted throat portion of said inner shell.

9. The valve assembly of claim 7 wherein said constricted throat portion has a wall thickness substantially greater than the other portions of said inner shell and wherein said anchor means is connected to the throat portion.

10. The valve assembly of claim 1 wherein said connecting means for said outer shell is a flanged end portion, having circumferentially spaced holes for mounting bolts, and said inner shell at one end has an expanded diametral end portion for receiving one end of an inner shell of an adjacent conduit.

11. The valve assembly of claim 1 wherein said inner shell has a central, constricted throat portion and wherein said anchor means is at least one set of circumferentially spaced hollow tubes secured at one end to the throat portion to thereby effect thermal longitudinal expansion and contraction of the shell in opposite directions from the plane of the hollow tubes.

12. The valve assembly of claim 1 wherein said outer shell has securing means for anchoring said layer of refractory material to the outer shell.

13. A valve assembly capable of use with fluids of high temperature and pressure comprising:
   (a) an inner shell of metal defining a flow path for a fluid at high temperatures and pressures;
   (b) an outer shell having a longitudinal axis and spaced from and surrounding said inner shell;
   (c) said outer shell being of metal and having a wall thickness greater than that of the inner shell;
   (d) a valve actuator support disposed substantially midway between the ends of said outer and inner shells and having an axis extending substantially normal to the longitudinal axis of the outer shell;
   (e) said valve actuator support having an inner member spaced from and coaxial with an outer member;
   (f) the said inner and outer members being secured in a fluid tight manner to the inner and outer shells respectively;
   (g) a valve actuator element disposed within and supported by said inner member of said valve actuator support and extending into said inner shell;
   (h) a movable valve element in said inner shell connected to said valve actuator element for movement to positions within the inner shell from a fully open to a fully closed position to control flow of fluid through said inner shell;
   (i) a layer of resilient heat insulating material covering substantially all of the outer surfaces of said inner shell and of a thickness to occupy part of the space between the inner and outer shells;
   (j) a body of refractory material having compressive strength substantially filling the remaining space between the inner and outer shells and the space between the inner and outer members of the valve actuator support;
   (k) anchor means connected to said inner shell adjacent the mid-point between the opposite ends of the inner shell to connect said refractory layer to said inner shell and allow radial movement of the inner shell relative to said refractory layer and longitudinal movement in opposite directions from the anchor means; and
   (l) said anchor means includes
      (l-1) two sets of circumferentially spaced pins, one set being disposed in a plane adjacent the opposite sides of the axis of the valve actuator support;
      (l-2) each pin being secured at one end to the inner shell and radially extending from the latter into a blind-hole in the body of refractory material and oversized in length relative to the associated pin so that the pin is free to move axially with radial movement of the inner shell relative to the outer shell, but restrained in longitudinal movement relative to the outer shell so that longitudinal movement of said inner shell is in opposite directions from each set of pins.

14. The apparatus of claim 13 wherein said movable valve element is a disc sealingly engaging the inner surface of the inner shell and rotatable about an axis co-extensive with the axis of rotation of the valve actuator element.

15. The apparatus of claim 13 wherein each of said pins is tubular and filled with heat insulating material.

16. The apparatus of claim 13 wherein said inner shell has a venturi configuration having a constricted throat portion and wherein said pins of said two sets of pins are connected to said throat portion in spaced parallel relationship.

17. The apparatus of claim 16 wherein said constricted throat portion has a wall thickness substantially greater than the wall thickness of the other portions of the inner shell.

18. A valve assembly capable of use with fluids of high temperature and pressure comprising:
   a. an inner shell having a longitudinal axis and an outer shell surrounding and spaced from the inner shell;
   b. a valve actuator support connected to the inner and outer shells between their respective opposite ends and having an axis extending substantially normal to the longitudinal axis of the inner shell;
   c. a layer of resilient insulating material covering substantially all of the outer surfaces of said inner shell and of a thickness to occupy part of the space between the inner and outer shells;
   d. a body of refractory material disposed within the remaining space between the inner and outer shells;
   e. a valve actuator means supported by the valve actuator support to project into the inner shell;
   f. a movable valve member in said inner shell and connected to the valve actuator means for movement to positions from a fully open to a fully closed position to thereby control fluid flow through said inner shell;
   g. an anchor means connected to said inner shell adjacent said movable valve member;
   h. said anchor means includes two sets of circumferentially spaced pins with each set of pins lying in a plane normal to the longitudinal axis of the inner shell, one set on each side of the axis of said valve actuator support, each pin being secured at one end of the inner shell and radially extending from the latter into a blind-hole in the refractory material, which blind-hole is oversized in length relative to the length of the associated pin so that the pin is free to move axially with radial movement of the inner shell relative to the outer shell but restrained from longitudinal movement so that longitudinal movement of the inner shell relative to the outer shell is in opposite direction from the sets of pins; and
   i. connecting means at opposite ends of the inner and outer shells for connecting said shells to fluid conducting elements.

19. The valve assembly of claim 18 wherein each of said pins is tubular and filled with heat insulating material.

* * * * *